United States Patent
Lane et al.

(10) Patent No.: US 12,017,835 B2
(45) Date of Patent: Jun. 25, 2024

(54) METHOD OF CONTROLLING VACUUM AND PRESSURE WITHIN A THERMOPLASTIC CONTAINER

(71) Applicant: AMCOR RIGID PACKAGING USA, LLC, Ann Arbor, MI (US)

(72) Inventors: Michael T. Lane, Brooklyn, MI (US); James Stelzer, South Lyon, MI (US); Frederick C. Beuerle, Jackson, MI (US); Omkar Dole, Kalamazoo, MI (US); Luke A. Mast, Brooklyn, MI (US)

(73) Assignee: AMCOR RIGID PACKAGING USA, LLC, Ann Arbor, MI (US)

( * ) Notice: Subject to any disclaimer, the term of this patent is extended or adjusted under 35 U.S.C. 154(b) by 149 days.

(21) Appl. No.: 17/792,326

(22) PCT Filed: Jan. 28, 2020

(86) PCT No.: PCT/US2020/015337
§ 371 (c)(1),
(2) Date: Jul. 12, 2022

(87) PCT Pub. No.: WO2021/154209
PCT Pub. Date: Aug. 5, 2021

(65) Prior Publication Data
US 2023/0054837 A1   Feb. 23, 2023

(51) Int. Cl.
*B65D 1/02* (2006.01)
*B29C 49/42* (2006.01)
(Continued)

(52) U.S. Cl.
CPC .... *B65D 79/0081* (2020.05); *B29C 49/42808* (2022.05); *B65D 1/0284* (2013.01);
(Continued)

(58) Field of Classification Search
CPC .............. B65D 79/0081; B65D 1/0284; B29C 49/42808; B67C 3/045; B67C 3/14; B67C 2003/226
See application file for complete search history.

(56) References Cited

U.S. PATENT DOCUMENTS

| | | | |
|---|---|---|---|
| 2009/0026198 | A1 | 1/2009 | Ichikawa et al. |
| 2009/0236776 | A1 | 9/2009 | Connolly et al. |

(Continued)

FOREIGN PATENT DOCUMENTS

| | | |
|---|---|---|
| EP | 2990344 A1 | 3/2016 |
| WO | 0050309 A1 | 8/2000 |
| WO | 2018089908 A1 | 5/2018 |

OTHER PUBLICATIONS

Supplementary European Search Report issued in corresponding EP Patent Application 20916518 dated Sep. 15, 2023.
(Continued)

*Primary Examiner* — Stephen J Castellano
(74) *Attorney, Agent, or Firm* — Harness, Dickey & Pierce, P.L.C.

(57) ABSTRACT

A method of forming a container and filling the container with a product. The method includes heat-set blow molding the container from a preform and hot-filling the container with the product such that the product occupies about 95% or more of a total interior volume of the container. A headspace volume is defined between a top fill line of the product and a brim of the container. The headspace volume is less than about 5% of the total interior volume of the container. The container is capped and allowed to cool. The container is configured to shrink during cooling such that the total interior volume decreases by about 0.5% to 1.5% during cooling. A base of the container is displaced after hot-filling and capping to reduce the total interior volume by less than about an additional 0.5% to 4%. The hot-filling,
(Continued)

capping, cooling, and displacing of the base creates a pressure change within the container.

32 Claims, 8 Drawing Sheets

(51) Int. Cl.
  *B65D 79/00* (2006.01)
  *B65D 81/20* (2006.01)
  *B67C 3/04* (2006.01)
  *B29L 31/00* (2006.01)
(52) U.S. Cl.
  CPC .......... *B65D 81/2038* (2013.01); *B67C 3/045* (2013.01); *B29L 2031/7158* (2013.01)

(56) References Cited

U.S. PATENT DOCUMENTS

| | | |
|---|---|---|
| 2013/0004692 A1 | 1/2013 | Hutts et al. |
| 2016/0083167 A1 | 3/2016 | Ichikawa et al. |
| 2019/0225355 A1 | 7/2019 | Siegl |
| 2019/0375547 A1 | 12/2019 | Suga et al. |

OTHER PUBLICATIONS

Office Action issued in corresponding Colombian Patent Application NC2022/0010601 dated Mar. 1, 2024.

| Container | Container Volume | Finish | Overflow Capacity(CC) | HeadSpace Volume (CC) | Headspace Volume (%) |
|---|---|---|---|---|---|
| Container 1 | 12oz | 33mm | 378.0000 | 9.5000 | 2.5132 |
| | | | | 0.0000 | 0.0000 |
| | | | | 19.0000 | 5.0265 |
| Container 2 | 16oz | 33mm | 500.0000 | 4.3000 | 0.8600 |
| | | | | 0.0000 | 0.0000 |
| | | | | 8.6000 | 1.7200 |
| Container 3 | 18.5oz | 38mm | 577.0000 | 13.0000 | 2.2530 |
| | | | | 0.0000 | 0.0000 |
| | | | | 26.0000 | 4.5061 |
| Container 4 | 20oz | 38mm | 622.0000 | 13.0000 | 2.0900 |
| | | | | 0.0000 | 0.0000 |
| | | | | 26.0000 | 4.1801 |
| Container 5 | 28oz | 38mm | 876.0000 | 13.0000 | 1.4840 |
| | | | | 0.0000 | 0.0000 |
| | | | | 26.0000 | 2.9680 |
| Container 6 | 32oz | 43mm | 987.0000 | 17.0000 | 1.7224 |
| | | | | 0.0000 | 0.0000 |
| | | | | 34.0000 | 3.4448 |
| Container 7 | 64oz | 38mm | 1945.0000 | 13.0000 | 0.6684 |
| | | | | 0.0000 | 0.0000 |
| | | | | 26.0000 | 1.3368 |
| Container 8 | 96oz | 43mm | 2941.0000 | 16.0000 | 0.5000 |
| | | | | 0.0000 | 0.0000 |
| | | | | 32.0000 | 1.1000 |

*FIG - 6A*

| Liquid Volume | Fill Level | Shrinkage | Base Displacement CC (As Calculated) |
|---|---|---|---|
| 97.5000 | Flange Fill | 0.0100 | 7.0000 |
| 100.0000 | Brim Fill | 0.0100 | 7.0000 |
| 94.9700 | Low Fill | 0.0100 | 7.0000 |
| 99.1000 | Flange Fill | 0.0100 | 10.0000 |
| 100.0000 | Brim Fill | 0.0100 | 10.0000 |
| 98.3000 | Low Fill | 0.0100 | 10.0000 |
| 96.7000 | Flange Fill | 0.0100 | 11.5000 |
| 100.0000 | Brim Fill | 0.0100 | 11.5000 |
| 95.5000 | Low Fill | 0.0100 | 11.5000 |
| 97.9000 | Flange Fill | 0.0100 | 12.0000 |
| 100.0000 | Brim Fill | 0.0100 | 12.0000 |
| 95.8000 | Low Fill | 0.0100 | 12.0000 |
| 98.5000 | Flange Fill | 0.0100 | 17.0000 |
| 100.0000 | Brim Fill | 0.0100 | 17.0000 |
| 97.0000 | Low Fill | 0.0100 | 17.0000 |
| 98.2776 | Flange Fill | 0.0100 | 19.0000 |
| 100.0000 | Brim Fill | 0.0100 | 19.0000 |
| 96.5552 | Low Fill | 0.0100 | 19.0000 |
| 99.3316 | Flange Fill | 0.0100 | 38.0000 |
| 100.0000 | Brim Fill | 0.0100 | 38.0000 |
| 98.6632 | Low Fill | 0.0100 | 38.0000 |
| 99.5000 | Flange Fill | 0.0100 | 58.0000 |
| 100.0000 | Brim Fill | 0.0100 | 58.0000 |
| 98.9000 | Low Fill | 0.0100 | 58.0000 |

*FIG - 6B*

| Base Displacement (%) | Final Pressure | Base Displacement (%) | Final Pressure |
|---|---|---|---|
| <=2% | Vacuum | >=2% | Pressure |
| 0.0200 | Neutral | 0.0200 | Neutral |
| <=2% | Vacuum | >=2% | Pressure |
| <=2% | Vacuum | >=2% | Pressure |
| 0.0200 | Neutral | 0.0200 | Neutral |
| <=2% | Vacuum | >=2% | Pressure |
| <=2% | Vacuum | >=2% | Pressure |
| 0.0200 | Neutral | 0.0200 | Neutral |
| <=2% | Vacuum | >=2% | Pressure |
| <=2% | Vacuum | >=2% | Pressure |
| 0.0200 | Neutral | 0.0200 | Neutral |
| <=2% | Vacuum | >=2% | Pressure |
| <=2% | Vacuum | >=2% | Pressure |
| 0.0200 | Neutral | 0.0200 | Neutral |
| <=2% | Vacuum | >=2% | Pressure |
| <=2% | Vacuum | >=2% | Pressure |
| 0.0200 | Neutral | 0.0200 | Neutral |
| <=2% | Vacuum | >=2% | Pressure |
| <=2% | Vacuum | >=2% | Pressure |
| 0.0200 | Neutral | 0.0200 | Neutral |
| <=2% | Vacuum | >=2% | Pressure |
| <=2% | Vacuum | >=2% | Pressure |
| 0.0200 | Neutral | 0.0200 | Neutral |
| <=2% | Vacuum | >=2% | Pressure |

METHOD OF CONTROLLING VACUUM AND PRESSURE WITHIN A THERMOPLASTIC CONTAINER

CROSS-REFERENCE TO RELATED APPLICATIONS

This application is a U.S. National Phase Application under 35 U.S.C. 371 of International Application No. PCT/US2020/015337 filed on Jan. 28, 2020. The entire disclosure of the above application is incorporated herein by reference.

FIELD

The present disclosure relates to control of vacuum and pressure within a thermoplastic container.

BACKGROUND

This section provides background information related to the present disclosure, which is not necessarily prior art. This section may also recite general features of the present disclosure, but is not a comprehensive disclosure of the present teachings.

Containers blow molded from various thermoplastics, such as polyethylene terephthalate, are used in the packaging industry to distribute food and beverages to consumers. Thermal processing of an oriented PET container, which is known as heat setting, typically includes blow molding a PET preform against a mold heated to a temperature of approximately 250° F.-350° F. (approximately 121° C.-177° C.), and holding the blown container against the heated mold for approximately two (2) to five (5) seconds. Manufacturers of PET juice bottles, which must be hot-filled at approximately 185° F. (85° C.), currently use heat setting to produce PET bottles having an overall crystallinity in the range of approximately 25%-35%.

In one example, a machine places the preform heated to a temperature between approximately 190° F. to 250° F. (approximately 88° C. to 121° C.) into the heated mold cavity. A stretch rod apparatus stretches or extends the heated preform within the mold cavity to a length approximately that of the intermediate container thereby molecularly orienting the polyester material in an axial direction generally corresponding with the central longitudinal axis of the container 10. While the stretch rod extends the preform, air having a pressure between 300 PSI to 600 PSI (2.07 MPa to 4.14 MPa) assists in extending the preform in the axial direction and in expanding the preform in a circumferential or hoop direction, thereby substantially conforming the polyester material to the shape of the mold cavity and further molecularly orienting the polyester material in a direction generally perpendicular to the axial direction, thus establishing the biaxial molecular orientation of the polyester material in most of the intermediate container. The pressurized air holds the mostly biaxial molecularly oriented polyester material against the mold cavity for a period of approximately two (2) to five (5) seconds before removal of the intermediate container from the mold cavity. This process is known as heat setting and results in a heat-resistant container suitable for filling with a product at high temperatures.

In order to sterilize the internal product and ensure freshness, the process of hot-filling is often used, which requires the product to be heated to temperatures from 180° F. to 205° F. prior to filling the container. After filling, the container is capped to integrally seal the container with a closure. After sealing, the container begins to cool to ambient temperature, resulting in an internal vacuum within the container at an ambient external temperature and pressure.

Various methods and structural features have been devised to address the internal container vacuum created by the hot fill process, such as vacuum panels, nitrogen dosing, compressible ribs and the like. One such method of controlling vacuum is by creating container base designs that move inward to reduce the internal container volume thereby lowering internal vacuum. These base designs can be passive or active. Active base designs require the use of an external mechanical force to reposition or displace the base inwardly.

Examples of passive and active base designs can be found in the following patent documents, each of which is assigned to Amcor and is incorporated herein by reference: U.S. Pat. No. 6,942,116 (issued Sep. 13, 2005) titled "Container Base Structure Responsive to Vacuum Related Forces;" U.S. Pat. No. 10,532,848 (issued Jan. 14, 2020) titled "Lightweight Container Base;" U.S. application Ser. No. 15/505,525 filed on Feb. 21, 2017 titled "Container Base Including Hemispherical Actuating Diaphragm;" and PCT/US2019/013646 filed on Jan. 15, 2019 titled "Vertical Displacement Container Base."

Existing active base configurations can utilize a displaceable panel that is substantially horizontal and transversely oriented across the base of the container. This approach allows for internal volume to be displaced through means of a large diameter panel that is displaced a relatively short distance. Some existing configurations utilize a centrally located truncated cone in the base of the container that is displaced a relatively long distance compared to the small diameter of the truncated cone. Yet other designs use a displaced dome shape that rolls into the container.

The active base configuration is displaced after the container has been filled and capped. As the container cools, it may be displaced at various points during cooling depending on the requirements of the filling line and the amount of pressure or vacuum that is desired in the container at any given point in the process. The repositioning of the base can occur, for example, in a labeling machine at the same time an external label is applied to the container, or at a dedicated station anywhere within the filling and conveying line.

While current containers are suitable for their intended use, it would be desirable to have precise control over whether there is a residual vacuum (negative gauge pressure), about zero gauge pressure, or positive gauge pressure within the container after filling, and measured at an external ambient temperature and pressure. The present disclosure advantageously provides such control, along with various other advantages described herein and as recognized by one skilled in the art.

Further areas of applicability will become apparent from the description provided herein. The description and specific examples in this summary are intended for purposes of illustration only and are not intended to limit the scope of the present disclosure.

SUMMARY

This section provides a general summary of the disclosure, and is not a comprehensive disclosure of its full scope or all of its features.

The present disclosure includes a method of forming a container and filling the container with a product. The method includes heat-set blow molding the container from a preform and hot-filling the container with the product such that the product occupies about 95% or more of a total interior volume of the container. A headspace volume is defined between a top fill line of the product and a brim of the container. The headspace volume is less than about 5% of the total interior volume of the container. The container is capped and allowed to cool. The container is configured to shrink during cooling such that the total interior volume decreases by about 1%, or about 0.5% to about 1.5%, during cooling. A base of the container is displaced after hot-filling and capping to reduce the total interior volume by less than about an additional 2%, or about 0.5% to about 2%. The hot-filling, capping, cooling, and displacing of the base creates a vacuum within the container at ambient external temperature and pressure.

The present disclosure further includes a method of forming a container and filling the container with a product. The method includes heat-set blow molding the container from a preform and hot-filling the container with the product such that the product occupies about 95% or more of a total interior volume of the container. A headspace volume is defined between a top fill line of the product and a brim of the container. The headspace volume is less than about 5% of the total interior volume of the container. The container is capped and allowed to cool. The container is configured to shrink during cooling such that the total interior volume decreases by about 1%, or about 0.5% to about 1.5%, during cooling. A base of the container is displaced after hot-filling and capping to reduce the total interior volume by about an additional 2%. The hot-filling, capping, cooling, and displacing of the base creates neutral pressure within the container at ambient external temperature and pressure.

The present disclosure also includes a method of forming a container and filling the container with a product. The method includes heat-set blow molding the container from a preform and hot-filling the container with the product such that the product occupies about 95% or more of a total interior volume of the container. A headspace volume is defined between a top fill line of the product and a brim of the container. The headspace volume is less than about 5% of the total interior volume of the container. The container is capped and allowed to cool. The container is configured to shrink during cooling such that the total interior volume decreases by about 1%, or about 0.5% to about 1.5%, during cooling. A base of the container is displaced after hot-filling and capping to reduce the total interior volume by more than about an additional 2%, or about 2% to about 4%. The hot-filling, capping, cooling, and displacing of the base creates positive pressure within the container at ambient external temperature and pressure.

The present disclosure still further includes a polymeric container hot-filled with a product. The polymeric container includes a finish, a shoulder, a body, and a displaceable base, which together define a total interior volume in which the product is stored. The product occupies about 95% or more of the total interior volume of the container, and a headspace volume is defined between a top fill line of the product and a brim of the finish. The headspace volume is less than about 5% of the total interior volume of the container. The container is configured such that subsequent to hot-filling and cooling the polymeric container, and prior to displacing the displaceable base, the total interior volume shrinks about 1%, or about 0.5% to about 2%. The base is configured such that subsequent to displacing the displaceable base after hot-filling and cooling, the total interior volume decreases by about an additional 2% or less. The container is configured such that subsequent to the hot-filling, capping, cooling, and displacing of the displaceable base, about zero to negative residual pressure is present within the polymeric container at ambient external temperature and pressure.

The present disclosure includes a polymeric container hot-filled with a product. The polymeric container includes a finish, a shoulder, a body, and displaceable base, which together define a total interior volume in which the product is stored. The product occupies about 95% or more of the total interior volume of the container, and a headspace volume is defined between a top fill line of the product and a brim of the finish. The headspace volume is less than about 5% of the total interior volume of the container. The container is configured such that subsequent to hot-filling and cooling the polymeric container, and prior to displacing the displaceable base, the total interior volume shrinks about 1%, or about 0.5% to about 2%. The base is configured such that subsequent to displacing the displaceable base after hot-filling and cooling, the total interior volume decreases by more than about an additional 2%. The container is configured such that subsequent to the hot-filling, capping, cooling, and displacing of the displaceable base, zero to positive residual pressure is present within the polymeric container at ambient external temperature and pressure.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

This disclosure provides for containers made of polyethylene terephthalate (PET) incorporating a base design having an optimized size and shape that resists container loading and pressures caused by hot fill pressure and resultant vacuum, and helps maintain container shape and response. An exemplary container is illustrated in FIGS. 1-4 at reference numeral 10. Parameters of additional exemplary containers are set forth in FIGS. 6A, 6B, and 6C.

This disclosure is directed to a thermoplastic container base (such as the base 60 illustrated in FIGS. 1-4) that can be mechanically displaced after the container is filled with product and capped, to reduce an internal vacuum or provide an increase in internal pressure. It should be appreciated that the size and specific configuration of the container may not be particularly limiting and, thus, the principles of the present disclosure can be applicable to a wide variety of PET container shapes. Therefore, it should be recognized that variations can exist in the present embodiments. That is, it should be appreciated that the teachings of the present disclosure can be used in a wide variety of containers, including rectangular, round, oval, squeezable, recyclable, and the like. The present teachings apply to hot-fill containers that hold an amount of product based upon common industry standards ranging from 12 oz to 96 oz. Common sizes include 12 oz, 16 oz, 18.5 oz, 20 oz, 28 oz, 32 oz, 64 oz, and 96 oz. Exemplary containers to which the present teachings are applicable to include those disclosed in the following patent documents, each of which is assigned to Amcor and is incorporated herein by reference: U.S. Pat. No. 6,942,116 (issued Sep. 13, 2005) titled "Container Base Structure Responsive to Vacuum Related Forces;" U.S. Pat. No. 10,532,848 (issued Jan. 14, 2020) titled "Lightweight Container Base;" U.S. application Ser. No. 15/505,525 filed on Feb. 21, 2017 titled "Container Base Including Hemispherical Actuating Diaphragm;" and PCT/US2019/013646 filed on Jan. 15, 2019 titled "Vertical Displacement Container Base."

PET is a semi-crystalline thermoplastic, with a glass transition temperature of about 76° C. PET preforms are typically heated above this temperature so the material becomes elastic and can be formed using a process called Stretch Blow Molding. During the blow molding process, the PET material is stretched to form the final container resulting in stretch-induced crystallization. The stresses in the material are then decreased, thus reducing the tendency of re-shrinking, thereby giving the material enhanced thermal stability. The glass transition temperature and the rigidity also increase. This process is called "Heat-Setting".

The heat-set bottle is then hot filled. During the hot fill process, the product is heated up to about 194 degrees in order to sterilize the product before it is filled into the heat-set container. The container is then capped and immediately cooled. Although the heat-set bottle will resist temperature induced shrinkage due to the hot-fill process, there can still be a small amount of shrinkage that occurs. The present disclosure is directed to any heat-set PET container that exhibits about 1% shrinkage based on volume after being hot-filled, such as, but not limited to, the container 10 described herein.

Hot-fill containers, such as the container 10, for example, are filled with product to a specified fill point or level within the container. The fill level can be to within a shoulder area 32 (low fill) at reference letters FL. The fill level can be to a support flange 26 (flange fill) at fill level FL'. The fill level may also be all the way to a top end, or brim, 12 (brim fill) of the container 10.

There are also variations in the filling equipment and process that creates fluctuations in the fill level. The volume between the product fill level FL, FL', FL" and the top end 12 (which is a top sealing surface of the container) is called the "head-space" volume. The total container volume is measured up to the top sealing surface of the container at the top end 12, after molding and prior to filling. The present disclosure is directed to any container hot filled with a product to a fill level leaving a head-space volume that is less than, or equal to, about 5% of the total container volume.

The exemplary container 10 of FIGS. 1-5 will now be described in further detail. The polymeric container 10 is blow-molded from any suitable preform. The container 10 may be made of any suitable polymeric material, such as polyethylene terephthalate (PET), low-density polypropylene (LDPP), high-density polyethylene (HDPE), polypropylene, and polystyrene, for example. The material of the container 10 may have an average material thickness of 0.011 inches or less, for example. The material of the container 10 may have has an intrinsic viscosity (IV) of 0.68 deciliters per gram (dL/g)-0.78 dL/g for polyethylene terephthalate, for example.

The container 10 is configured to store any suitable hot-fill material, such as any suitable beverage and/or food product. The container 10 may be of any suitable size, such as, but not limited to, 12-96 ounces, for example. The container 10 may have any suitable shape, such as, but not limited to, the shape illustrated throughout the figures. The container 10 includes an overall diameter of ØC.

The exemplary container 10 generally has the first end 12 and a second end 14, which is opposite to the first end 12. The first end 12 is at a top brim of the container 10, which serves at a top sealing surface. A longitudinal axis A extends along a length/height of the container 10 along an axial center of the container 10, which is generally cylindrical. At the first end 12 is a finish 20, which defines an opening 22 of the container 10. The finish 20 includes threads 24, or any other suitable configuration suitable for coupling a closure (e.g., cap) to the finish 20 to seal the opening 22 closed. For example, the threads 24 may be external threads as illustrated, or internal threads in some applications.

Below the finish 20 is the flange 26, which is suitable for holding the preform in a blow-molding machine as the container 10 is formed from the preform. The flange 26 is between the finish 20 and a neck 30. A shoulder 32 extends downward from the neck 30, and outward from the longitudinal axis A. The shoulder 32 extends to a body 40 of the container 10. The body 40 includes a cylindrical sidewall 42, which generally extends to a base 60 of the container 10. The sidewall 42 includes a plurality of ribs 44A. The body 40 defines a majority of an internal volume 48 of the container 10 in which the commodity is stored. The internal volume 48 is further defined by the shoulder 32 and the finish 20.

Figure 1:
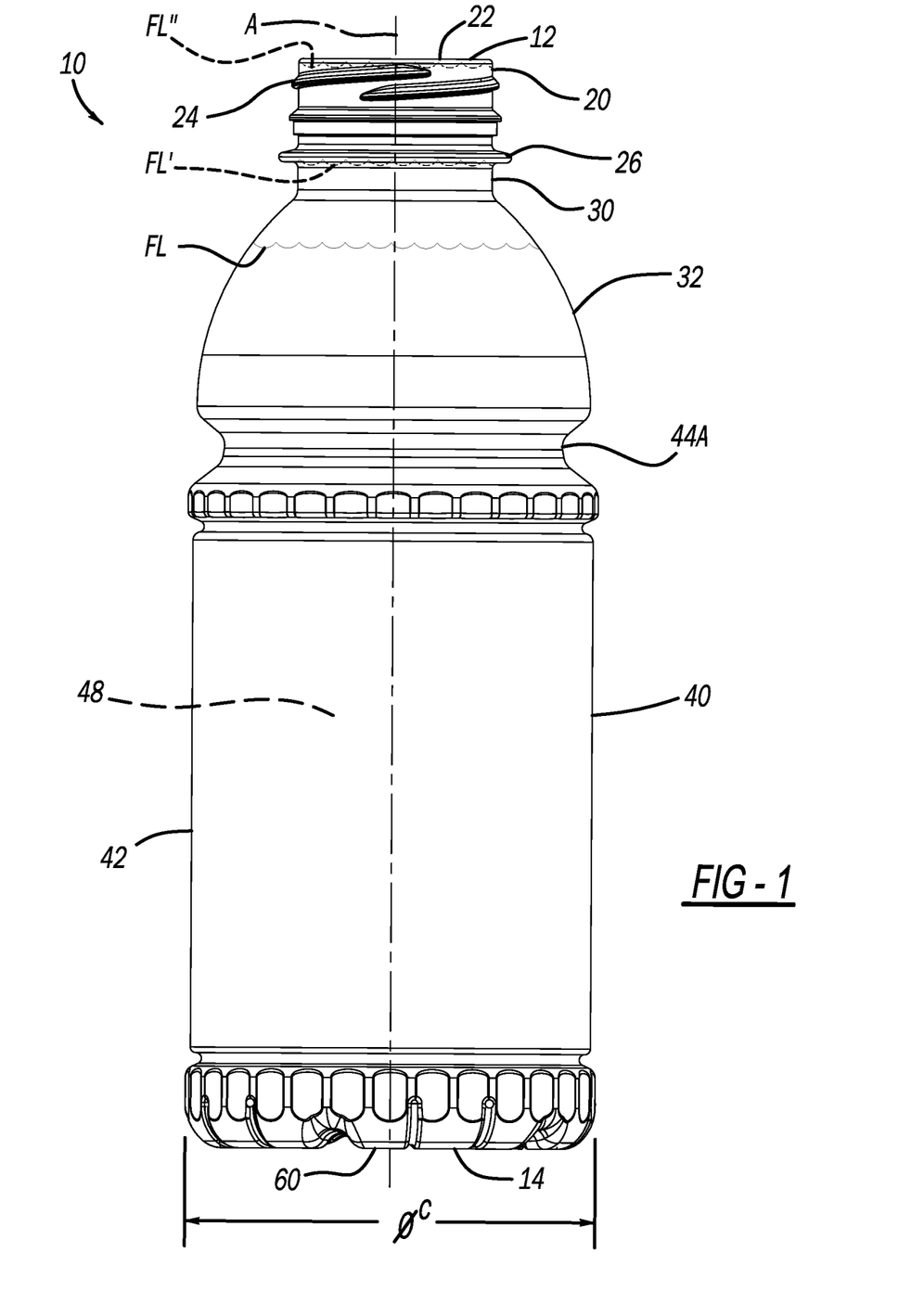
FIG. 1 is a side view of an exemplary container in accordance with the present disclosure.
Figure 2:
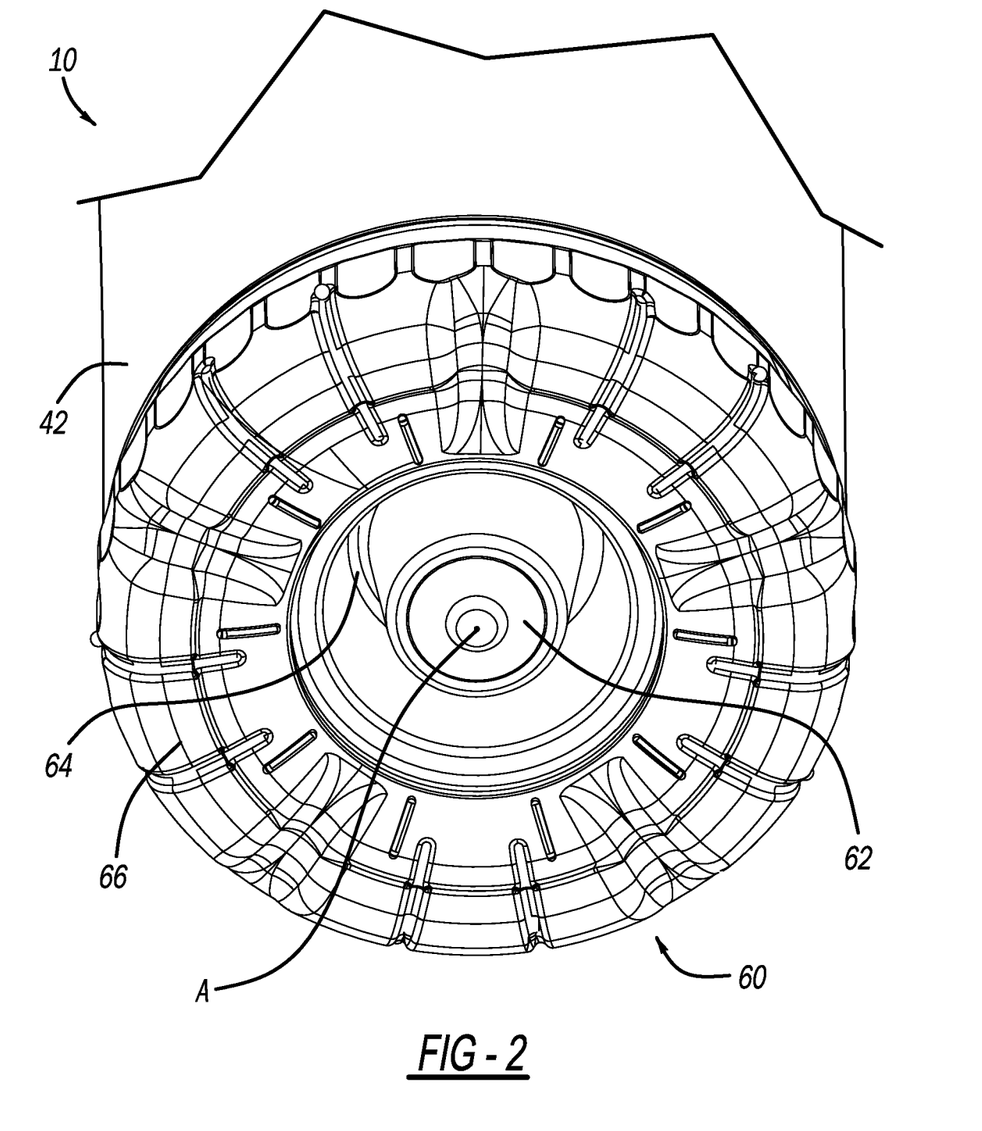
FIG. 2 is a perspective view of a base of the container of FIG. 1, the base including a truncated cone portion in an as-blown position.

With continued reference to FIG. 1 and additional reference to FIGS. 2-5, the base 60 will now be described in further detail. The base 60 generally includes a truncated cone 62 at an axial center of the base 60. The longitudinal axis A extends through a center of the truncated cone 62. Surrounding the truncated cone 62, and partially defining the truncated cone 62, is a deep base ring 64. The cone 62 and the ring 64 have a diameter ØR. The deep base ring 64 extends into the base 60 a distance of BR (see FIG. 4) from the standing surface 66.

Figure 3:
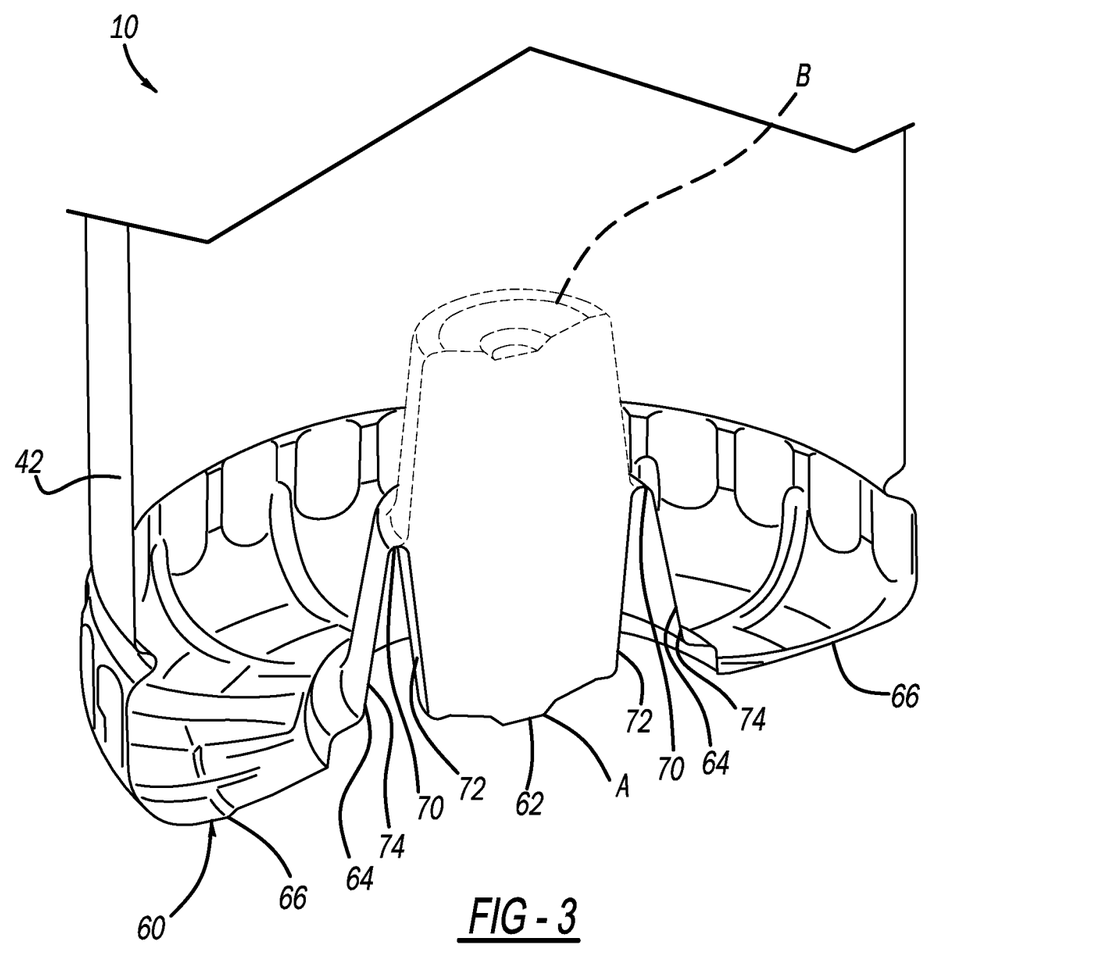
FIG. 3 is a cross-sectional view of the base of the container of FIG. 1, with solid lines illustrating the truncated cone portion in the as-blown position and phantom lines illustrating the truncated cone in a displaced position subsequent to hot-filling and mechanical displacement of the truncated cone.
Figure 4:
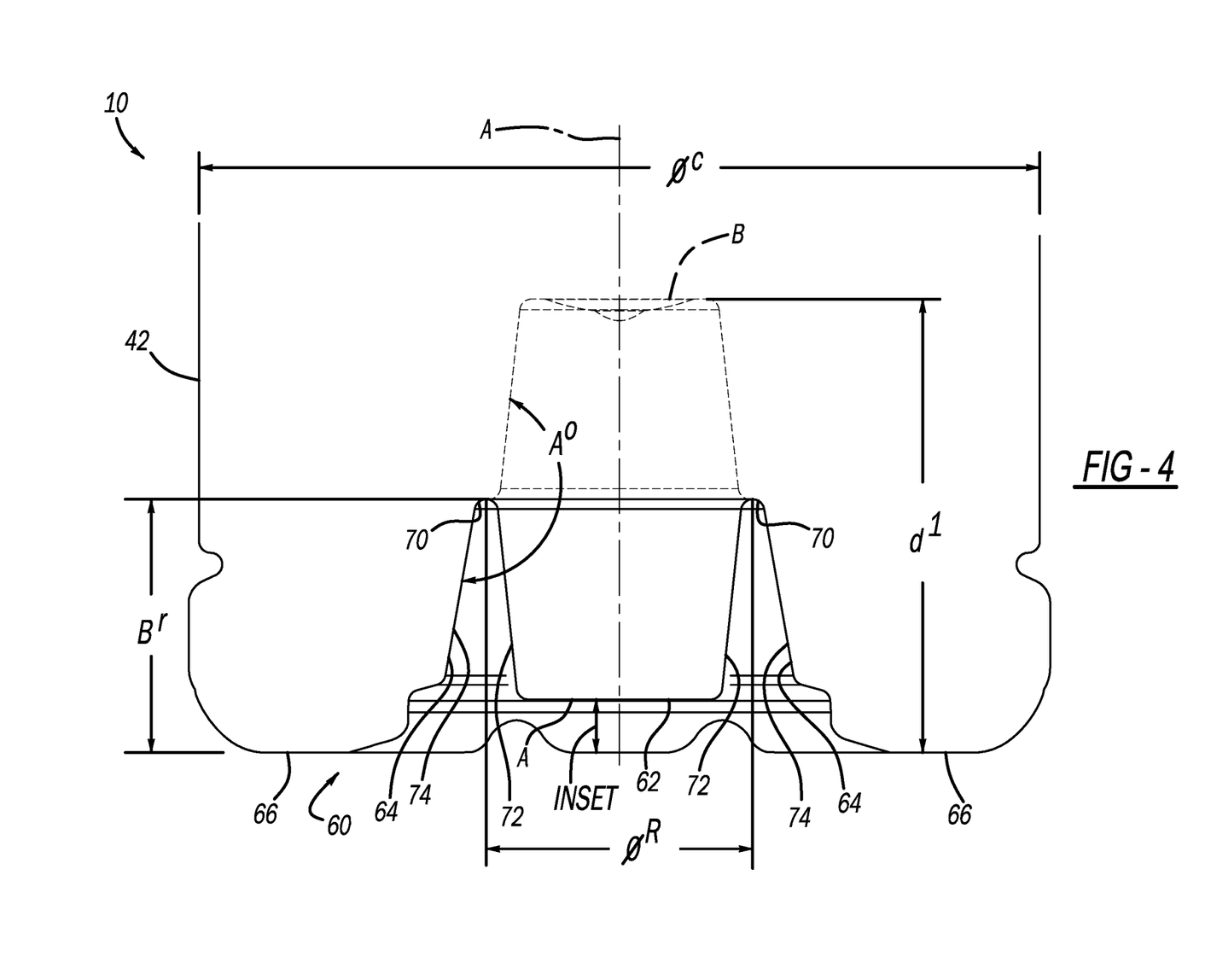
FIG. 4 is another cross-sectional view of the base of the container of FIG. 1, with solid lines illustrating the truncated cone portion in the as-blown position and phantom lines illustrating the truncated cone in the displaced position subsequent to hot-filling and mechanical displacement of the truncated cone.
Figure 5:
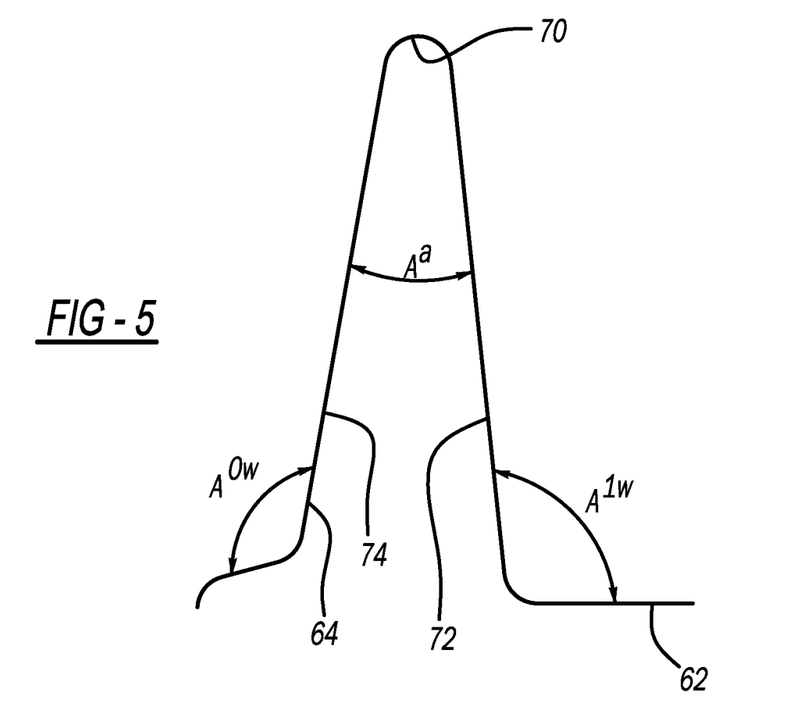
FIG. 5 is a cross-sectional view of a deep base ring of the container of FIG. 1, the deep base ring at least partially defined by the truncated cone portion in the as-blown position.

The deep base ring 64 is between the truncated cone 62 and a standing surface 66. The truncated cone 62 is inset from the standing surface 66 (see FIG. 4, for example). The standing surface 66 provides a surface configured to support the container 10 upright when seated on a flat surface. With particular reference to FIGS. 3-5, the deep base ring 64 includes a hinge 70 from which extends an inner sidewall 72 and an outer sidewall 74. The inner sidewall 72 is also part of the truncated cone 62.

The truncated cone 62 is formed in any suitable manner, such as with any suitable blow-mold with a movable base insert ring, which is used to create the deep based ring 64 surrounding the truncated cone 62. During blow-molding of the container 10 from the preform, a base insert ring component of a blow mold is in a retracted position relative to the rest of the base tooling, which allows plastic material from the preform to flow into the cavity that is created. The base ring component is then moved into the extended position, which stretches and forms the plastic into the final shape of the deep base ring 64 (see the following U.S. patent, which is assigned to Amcor and incorporated herein by reference: U.S. Pat. No. 8,313,686 titled "Flex Ring Base," issued on Feb. 6, 2009).

FIG. 3 illustrates an as-blown position of the truncated cone 62 at reference letter A. In the as-blown position A, the inner sidewall 72 is opposite to the outer sidewall 74. With reference to FIG. 5, the inner and outer sidewalls 72 and 74 extend from the hinge 70 at an acute angle Aa. The acute angle Aa may be any suitable acute angle, such as 16°-43°, and particularly about 25°. The inner sidewall 72 is oriented at an angle A1w from the truncated cone 62 at any suitable obtuse angle, such as 91°-130° as measured from a plane that is generally parallel to the standing surface 66. The outer sidewall 74 is arranged at an angle A0w of 91°-130° as measured from the plane that is generally parallel to the standing surface 66. The angles and depth of the deep base ring 64 can be modified to control material thickness, inversion force, reversion force, and volume displaced of the truncated cone 62.

After the container 10 is hot-filled and the opening 22 is sealed with any suitable closure, the truncated cone 62 is displaced from the as-blown position A to the retracted position B. The truncated cone 62 is displaced to the retracted position B mechanically using any suitable inversion tool, such as a displacement rod that is actuated with a servomotor, hydraulic cylinder, or pneumatic cylinder. In the displaced, retracted position B, the angle between the inner sidewall 72 and the outer sidewall 74 is any suitable obtuse angle A0 of 143°-184°, such as 163° for example (see FIG. 4). Thus, the angle between the inner sidewall 72 and the outer sidewall 74 increases from the as-blown position A to the retracted position B a factor of about 3.3-11.5 times, such as about 6.5 times. The truncated cone 62 moves a distance d1 from the as-blown position A to the retracted position B. Mechanical displacement of the truncated cone 62 from the as-blown position A to the retracted position B advantageously reduces the internal volume 48, thereby decreasing vacuum or increasing pressure within the container 10.

The base 60 advantageously has a low cone diameter Ør to displacement distance d1 of 2:1 or less. For example, the cone diameter Ør to displacement distance d1 can be in the range of 0.2:1 to 2:1, such as about 1:1. The overall container diameter Øc to deep base ring diameter Ør is about 3:1, such as in the range of 2:1-4:1. The container diameter Øc is about three times greater than the displacement distance (or activated depth) d1.

The present disclosure provides numerous advantages over the art. For example, the container 10 having the dimensions and configurations set forth above enables the sidewall 42 and overall material of the container to be made thinner, particularly at the base area 60 (the material of the container 10 has an average material thickness of less than 0.010 inches). This increases the stretch induced crystallinity at the base 60, which is usually an amorphous area due to lower material stretching. The present disclosure allows for more precise control of container volume displacement to create a specific vacuum or pressure level in the container 10, and prevents over pressurization and spilling when the container 10 is opened. Furthermore, the disclosed configuration of the base 60 advantageously increases the force required to revert the truncated cone 62 from the retracted position B to the as-blown position A.

The container 10 advantageously utilizes the centrally located truncated cone 62 that is displaced a relatively long distance d1 compared to the small diameter Ør of the truncated cone 62. Thus the container 10 advantageously accomplishes volume reduction of the internal volume 48 using vertically oriented displacement versus transversely oriented inversion.

An advantage of the small diameter of the truncated cone 62 is that there is a large surface area between the deep base ring 64 and the heal/outer diameter of the container 10. The overall container diameter Øc to the diameter Ør of the deep base ring 64 is about 3:1. This area serves to support the truncated cone 62 when it is in the retracted position (activated/displaced) B so that the truncated cone 62 will not revert if a plurality of the containers are stacked or dropped. The truncated cone is mechanically displaced to the retracted position B after the container is filled and capped. As the container 10 cools, it may be displaced at various points during cooling depending on requirements of the filling line and the amount of pressure or vacuum that is desired in the container 10 at any given point in the process. This repositioning of the base 60 may occur for example in a labeling machine at the same time an external label is applied to the label or at a dedicated station anywhere within the filling and conveying line.

The active design of the base 60 advantageously reduces the internal volume 48 of the container 10 after the container 10 has been filled and capped. The base displacement volume can be designed to create the desired vacuum or pressure condition in the container 10 after it has been filled, capped, and cooled. The present disclosure is directed to any suitable container, such as the container 10, having a base displacement volume of 0.5% to 4% of the total interior volume 48 of the container 10.

The desired final container pressure (or vacuum) state can be varied to accommodate the intended use of the container 10. In some applications, it is advantageous to have residual vacuum in the container 10 to add structural strength, indicate freshness, or prevent overflow and spilling when the container is opened. In other applications, it is advantageous to have a residual positive pressure in the container 10 to help prevent dents and deformations during packaging and distribution. In yet other cases, it may be advantageous to have a neutral pressure within the container to allow for slight variations in pressure and vacuum due to changes in ambient temperature. The present disclosure advantageously allows the container 10, and any other suitable container, to be configured with such a customized pressure/vacuum state.

Figure 6A:
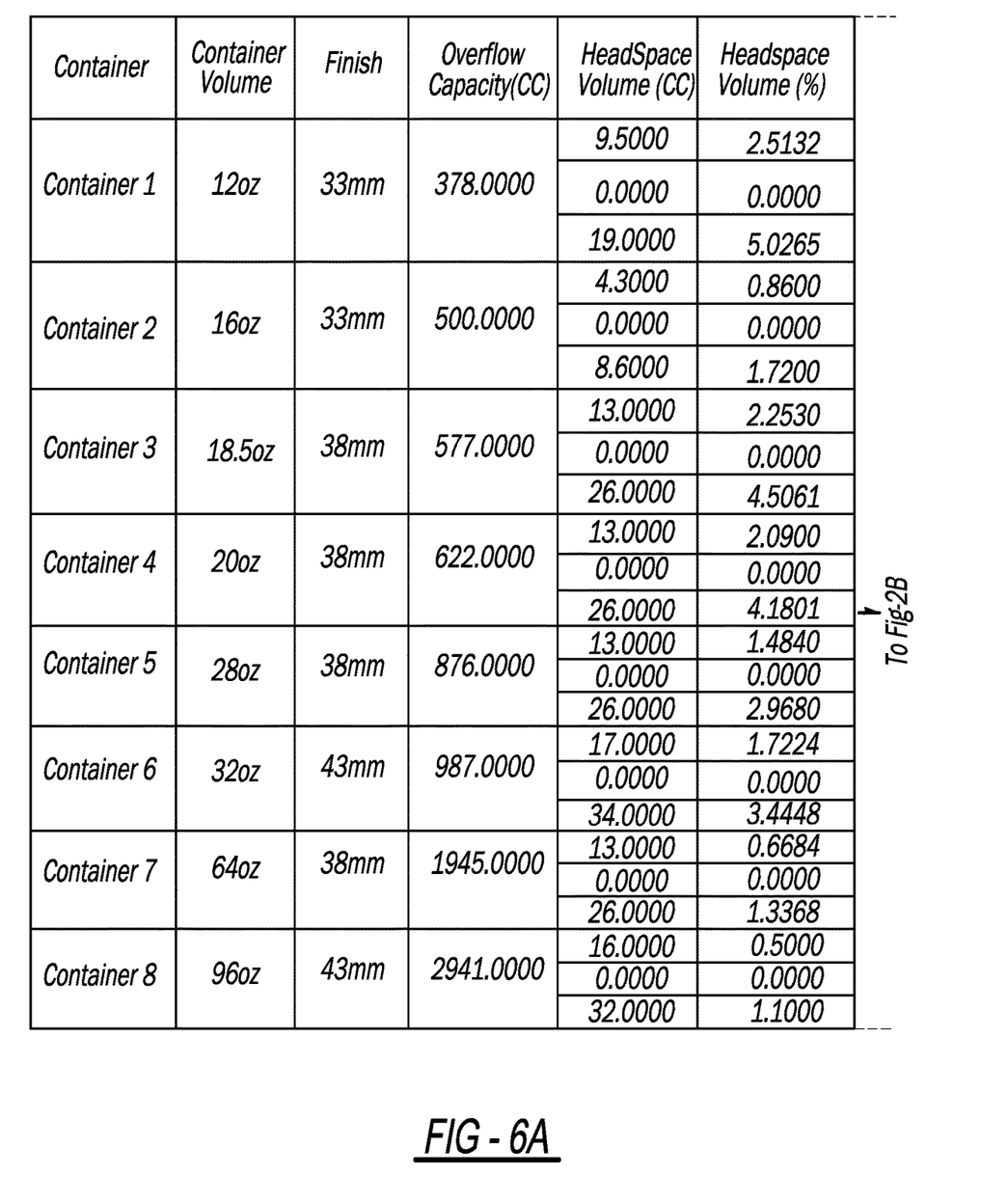
FIG. 6A, FIG. 6B, and FIG. 6C set forth parameters of various containers in accordance with the present disclosure.
Figure 6B:
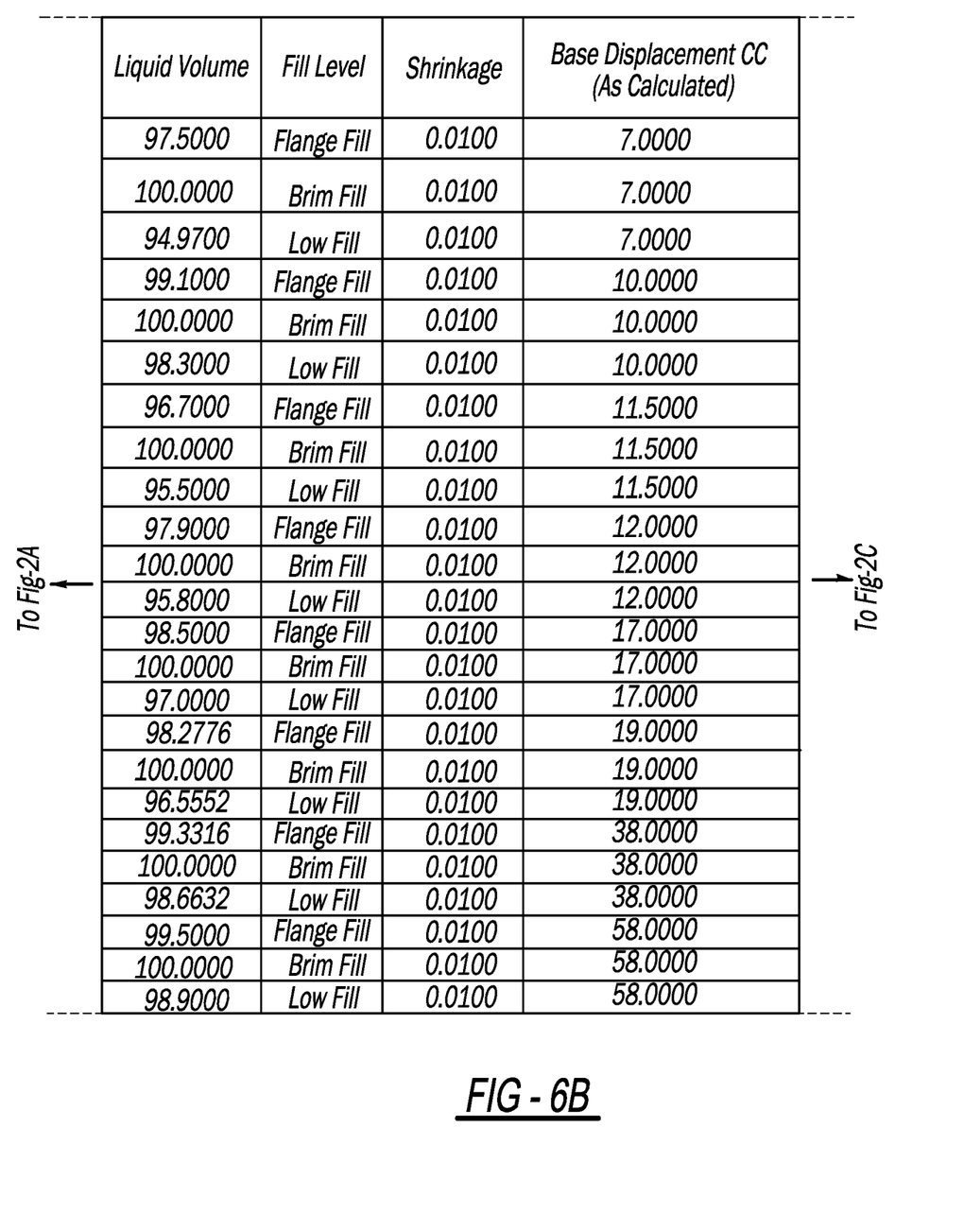
Figure 6C:
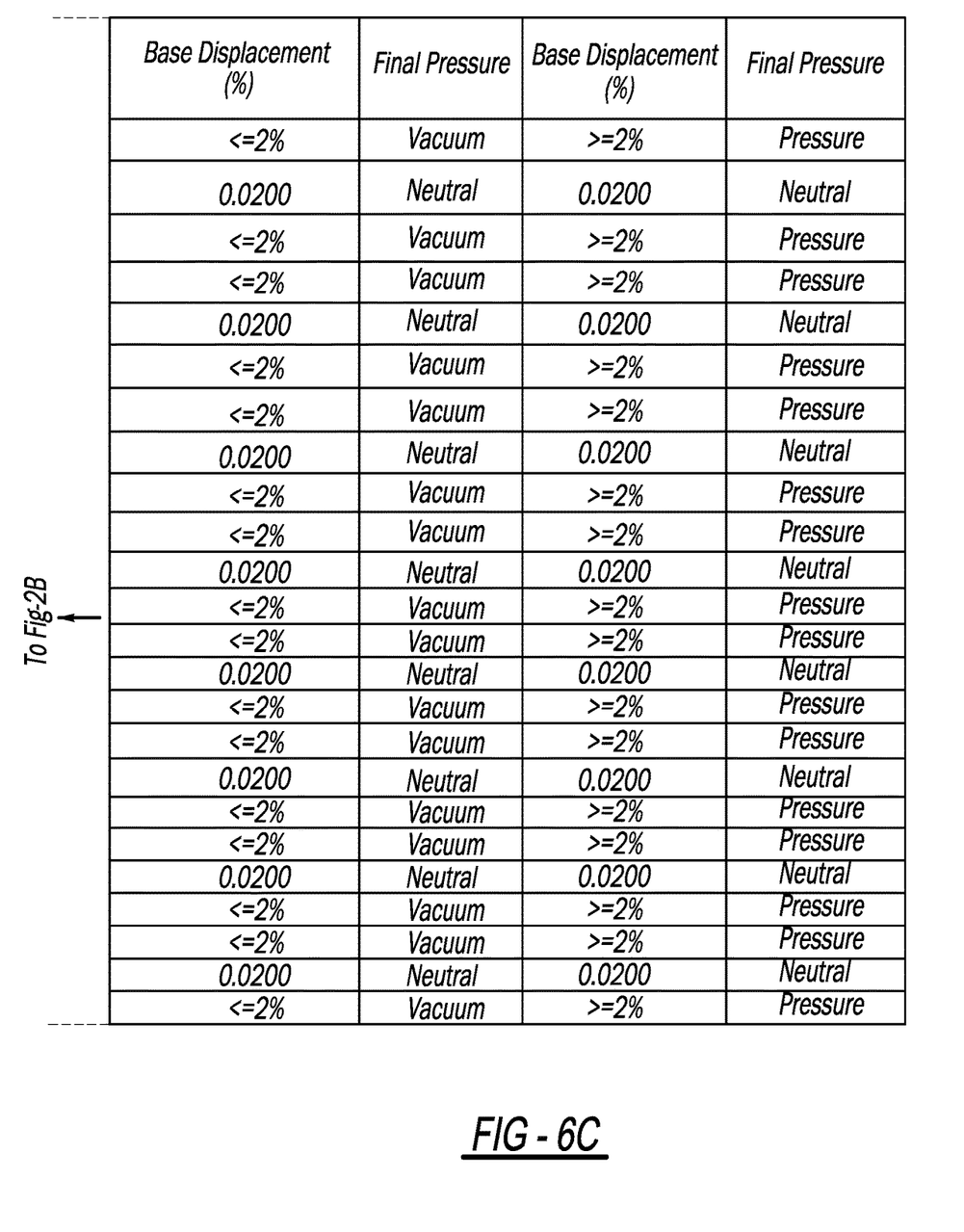

For example, FIGS. 6A, 6B, and 6C set forth the parameters of various exemplary containers in accordance with the present disclosure, and the final pressure thereof. The exemplary containers may be the container 10, or any other suitable container having a base displacement volume of 0.5% to 4% of the total interior volume of the container when the base thereof is actuated. Additional exemplary containers are set forth in the following patent documents, which as explained above are incorporated herein by reference: U.S. Pat. No. 6,942,116 (issued Sep. 13, 2005) titled "Container Base Structure Responsive to Vacuum Related Forces;" U.S. Pat. No. 10,532,848 (issued Jan. 14, 2020) titled "Lightweight Container Base;" U.S. application Ser. No. 15/505,525 filed on Feb. 21, 2017 titled "Container Base Including Hemispherical Actuating Diaphragm;" and PCT/US2019/013646 filed on Jan. 15, 2019 titled "Vertical Displacement Container Base."

The exemplary containers are formed and filled in accordance with a method that includes heat-set blow molding the container (the container 10, for example) from any suitable preform, such as by the heat-set blow molding process described above. The container is hot-filled with the product such that the product occupies about 95% or more of the total interior volume 48 of the container. A headspace volume is defined between a top fill line FL of the product and a brim of the container. The brim may be at the top end 12 of the container 10, which serves at a top sealing surface. The headspace volume is less than about 5% of the total interior volume of the container. The container is capped and allowed to cool. The container is configured to shrink during cooling such that the total interior volume decreases by about 1% during cooling. The base of the container (such as base 60 of container 10) is displaced after hot-filling and capping to reduce the total interior volume 48.

The degree to which the total interior volume 48 is reduced depends on the configuration of the base 60 and the degree to which it is displaced. For example, to create a vacuum within the container 10, the base 60 is configured such that displacing the base 60 reduces the total interior volume 48 by less than about an additional 2% (such as 0.5%-2%) after hot filling and capping. To provide neutral pressure/vacuum within the total interior volume 48, the base 60 is configured such that displacing the base 60 reduces the total interior volume 48 by about 2% after hot filling and capping. To provide positive pressure within the total interior volume 48, the base 60 is configured such that displacing the base 60 reduces the total interior volume 48 by more than about 2% (such as 2% to 4%) after hot filling and capping. Whether the container 10 is filled with product to fill level FL at shoulder 32, fill level FL' at flange 26, or fill level FL" to the brim at top end 12 also effects the final pressure, as set forth in the examples of FIGS. 6A, 6B, 6C.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of forming a container and filling the container with a product, the method comprising:
heat-set blow molding the container from a preform;
hot-filling the container with the product such that the product occupies about 95% or more of a total interior volume of the container, and a headspace volume is defined between a top fill line of the product and a brim of the container, the headspace volume is less than about 5% of the total interior volume of the container;

capping the container and allowing the container to cool, the container configured to shrink during cooling such that the total interior volume decreases by about 0.5% to 1.5% during cooling; and displacing a base of the container after hot-filling and capping to reduce the total interior volume by about 0.5% to about 4%;

wherein the hot-filling, capping, cooling, and displacing of the base creates a pressure change within the container.

2. The method of claim 1, wherein upon displacing the base less than about 2% to reduce the total interior volume, negative pressure is present within the container.

3. The method of claim 1, wherein upon displacing the base about 2% to reduce the total interior volume, neutral pressure is present within the container.

4. The method of claim 1, wherein upon displacing the base more than about 2% to reduce the total interior volume, positive pressure is present within the container.

5. The method of claim 1, wherein the container is configured to shrink during cooling such that the total interior volume decreases by about 1%.

6. The method of claim 1, wherein the pressure change is measured at ambient external temperature and pressure.

7. A method of forming a container and filling the container with a product, the method comprising:

heat-set blow molding the container from a preform;

hot-filling the container with the product such that the product occupies about 95% or more of a total interior volume of the container, and a headspace volume is defined between a top fill line of the product and a brim of the container, the headspace volume is less than about 5% of the total interior volume of the container;

capping the container and allowing the container to cool, the container configured to shrink during cooling such that the total interior volume decreases by about 0.5% to 1.5% during cooling; and displacing a base of the container after hot-filling and capping to reduce the total interior volume by less than about an additional 2%;

wherein the hot-filling, capping, cooling, and displacing of the base creates a vacuum within the container at ambient external temperature and pressure.

8. The method of claim 7, wherein hot-filling the container includes hot filling the container with the product until the top fill line is: at the brim of the container; even with a flange at a finish of the container; or at a shoulder of the container.

9. The method of claim 7, wherein the total interior volume of the container after the hot-filling, capping, cooling, and displacing of the base is 12 oz-96 oz.

10. The method of claim 7, wherein displacing the base of the container reduces the total interior volume by about 0.5%-2%.

11. The method of claim 7, wherein the container is configured to shrink during cooling such that the total interior volume decreases by about 1%.

12. A method of forming and filling a container with a product, the method comprising:

heat-set blow molding the container from a preform;

hot-filling the container with the product such that the product occupies about 95% or more of a total interior volume of the container, and a headspace volume is defined between a top fill line of the product and a brim of the container, the headspace volume is less than about 5% of the total interior volume of the container;

capping the container and allowing the container to cool, the container configured to shrink during cooling such that the total interior volume decreases by about 0.5% to 1.5% during cooling; and displacing a base of the container after hot-filling and capping to reduce the total interior volume by about an additional 2%;

wherein the hot-filling, capping, cooling, and displacing of the base creates neutral pressure within the container at ambient external temperature and pressure.

13. The method of claim 12, wherein hot-filling the container includes hot filling the container with the product until the top fill line is: at the brim of the container; even with a flange at a finish of the container; or at a shoulder of the container.

14. The method of claim 12, wherein the interior volume of the container is 12 oz-96 oz.

15. The method of claim 12, wherein the container is configured to shrink during cooling such that the total interior volume decreases by about 1%.

16. A method of forming and filling a container with a product, the method comprising:

heat-set blow molding the container from a preform;

hot-filling the container with the product such that the product occupies about 95% or more of a total interior volume of the container, and a headspace volume is defined between a top fill line of the product and a brim of the container, the headspace volume is less than about 5% of the total interior volume of the container;

capping the container and allowing the container to cool, the container configured to shrink during cooling such that the total interior volume decreases by about 0.5% to 1.5% during cooling; and displacing a base of the container after hot-filling and capping to reduce the total interior volume by more than about an additional 2%;

wherein the hot-filling, capping, cooling, and displacing of the base creates positive pressure within the container at ambient external temperature and pressure.

17. The method of claim 16, wherein hot-filling the container includes hot filling the container with the product until the top fill line is: at the brim of the container; even with a flange at a finish of the container; or at a shoulder of the container.

18. The method of claim 16, wherein the interior volume of the container is 12 oz-96 oz.

19. The method of claim 16, wherein displacing the base of the container reduces the total interior volume by about 2%-4%.

20. The method of claim 16, wherein the container is configured to shrink during cooling such that the total interior volume decreases by about 1%.

21. A polymeric container hot-filled with a product comprising:

a finish, a shoulder, a body, and a displaceable base, which together define a total interior volume in which the product is stored, the product occupies about 95% or more of the total interior volume of the container, and a headspace volume is defined between a top fill line of the product and a brim of the finish, the headspace volume is less than about 5% of the total interior volume of the container;

wherein the container is configured such that subsequent to hot-filling and cooling the polymeric container, and prior to displacing the displaceable base, the total interior volume shrinks about 0.5% to 1.5%;

wherein the base is configured such that subsequent to displacing the displaceable base after hot-filling and cooling, the total interior volume decreases by about an additional 2% or less; and wherein the container is configured such that subsequent to the hot-filling, capping, cooling, and displacing of the displaceable base, zero to negative residual pressure is present within the polymeric container at ambient external temperature and pressure.

22. The polymeric container of claim 21, wherein the polymeric container is heat-set blow molded from a preform.

23. The polymeric container of claim 21, wherein the polymeric container is hot-filled with the product such that the top fill line is one of: at the brim of the container; even with a flange at the finish of the container; or at the shoulder of the polymeric container.

24. The polymeric container of claim 21, wherein the total interior volume of the polymeric container after the hot-filling, capping, cooling, and displacing the displaceable base is 12 oz-96 oz.

25. The polymeric container of claim 21, wherein the displaceable base is configured such that subsequent to displacing the displaceable base the total interior volume decreases by an additional 0.5%-2%.

26. The polymeric container of claim 21, wherein the container is configured to shrink during cooling such that the total interior volume decreases by about 1%.

27. A polymeric container hot-filled with a product comprising:

a finish, a shoulder, a body, and a displaceable base, which together define a total interior volume in which the product is stored, the product occupies about 95% or more of the total interior volume of the container, and a headspace volume is defined between a top fill line of the product and a brim of the finish, the headspace volume is less than about 5% of the total interior volume of the container;

wherein the container is configured such that subsequent to hot-filling and cooling the polymeric container, and prior to displacing the base, the total interior volume shrinks about 0.5% to 1.5%;

wherein the base is configured such that subsequent to displacing the base after hot-filling and cooling, the total interior volume decreases by more than an additional 2%; and wherein the container is configured such that subsequent to the hot-filling, capping, cooling, and displacing of the displaceable base, positive pressure is present within the polymeric container at ambient external temperature and pressure.

28. The polymeric container of claim 27, wherein the polymeric container is heat-set blow molded from a preform.

29. The polymeric container of claim 27, wherein the polymeric container is hot-filled with the product such that the top fill line is one of: at the brim of the container; even with a flange at the finish of the container; or at the shoulder of the polymeric container.

30. The polymeric container of claim 27, wherein the total interior volume of the polymeric container after the hot-filling, capping, cooling, and displacing the displaceable base is 12 oz-96 oz.

31. The polymeric container of claim 27, wherein the displaceable base is configured such that subsequent to displacing the displaceable base the total interior volume decreases by an additional 2%-4%.

32. The polymeric container of claim 27, wherein the container is configured to shrink during cooling such that the total interior volume decreases by about 1%.

* * * * *